(12) United States Patent
Maeda (10) Patent No.: US 11,975,790 B2
(45) Date of Patent: May 7, 2024

(54) STRADDLED VEHICLE

(71) Applicant: YAMAHA HATSUDOKI KABUSHIKI KAISHA, Iwata (JP)

(72) Inventor: Tomohito Maeda, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 106 days.

(21) Appl. No.: 17/067,153

(22) Filed: Oct. 9, 2020

(65) Prior Publication Data

US 2021/0107585 A1  Apr. 15, 2021

(30) Foreign Application Priority Data

Oct. 11, 2019  (JP) .................................. 2019-188039

(51) Int. Cl.
*B62K 19/24* (2006.01)
*B62K 11/04* (2006.01)
*B62K 25/28* (2006.01)

(52) U.S. Cl.
CPC .............. *B62K 19/24* (2013.01); *B62K 11/04* (2013.01); *B62K 25/283* (2013.01)

(58) Field of Classification Search
CPC ...... B62K 25/28; B62K 25/283; B62K 11/04; B62K 19/24; B62K 19/26; B62K 19/28; B62K 11/02; B62K 11/12; B62K 19/06; B62K 19/32; B62M 7/00
See application file for complete search history.

(56) References Cited

U.S. PATENT DOCUMENTS

| 6,505,847 B1 | 1/2003 | Greene | |
| 8,657,321 B2* | 2/2014 | Kashiwai | B62K 11/04 |
| | | | 280/283 |
| 2009/0242305 A1* | 10/2009 | Asano | B62K 11/04 |
| | | | 180/219 |

(Continued)

FOREIGN PATENT DOCUMENTS

| CN | 1485242 A | 3/2004 |
| CN | 101181920 A | 5/2008 |

(Continued)

OTHER PUBLICATIONS

Office Action in the couterpart Chinese patent application (202011077629.8) dated Oct. 9, 2021.

(Continued)

*Primary Examiner* — Anne Marie M Boehler
(74) *Attorney, Agent, or Firm* — Rabin & Berdo, P.C.

(57) ABSTRACT

A main frame has a pair of left and right main rails that respectively include left and right front portions, left and right middle portions, and left and right rear end portions. One end portion of the left main rail and one end portion of the right main rail are connected to each other, whereby a head pipe is formed. A first coupling member is attached to the left and right front portions with a plurality of the first bolts, so that the front portions are coupled to each other. A second coupling member is attached to the left and right middle portions with a plurality of the second bolts, so that the middle portions are coupled to each other. A third coupling member is attached to the left and right rear portions with a plurality of the third bolts, so that the rear portions are coupled to each other.

7 Claims, 7 Drawing Sheets

(56) References Cited

U.S. PATENT DOCUMENTS

| | | | |
|---|---|---|---|
| 2011/0226543 A1 | 9/2011 | Kashiwai et al. | |
| 2012/0211295 A1* | 8/2012 | Nagai | B60T 8/3225 |
| | | | 180/219 |
| 2014/0262580 A1* | 9/2014 | Bagnariol | B62J 15/02 |
| | | | 180/218 |
| 2016/0244116 A1 | 8/2016 | Komatsu et al. | |
| 2017/0183055 A1* | 6/2017 | Takaya | B62K 11/04 |
| 2019/0300086 A1* | 10/2019 | Enami | B62J 1/08 |
| 2020/0031419 A1* | 1/2020 | Dennert | B62K 11/04 |
| 2021/0094650 A1* | 4/2021 | Sanders | B62K 25/286 |
| 2021/0107586 A1* | 4/2021 | Maeda | B23P 19/04 |

FOREIGN PATENT DOCUMENTS

| | | | | |
|---|---|---|---|---|
| CN | 101683815 A | 3/2010 | | |
| CN | 103359229 A | 10/2013 | | |
| CN | 104554562 A | 4/2015 | | |
| CN | 106394685 A | 2/2017 | | |
| CN | 106945771 A | 7/2017 | | |
| CN | 206317942 U | 7/2017 | | |
| CN | 206679167 U | 11/2017 | | |
| CN | 108423111 A | 8/2018 | | |
| CN | 108473039 A | 8/2018 | | |
| EP | 0741060 A2 | 11/1996 | | |
| EP | 2096023 A2 | 9/2009 | | |
| EP | 3533699 A1 | 9/2019 | | |
| EP | 3674195 A1 | 7/2020 | | |
| JP | S59134071 A | 8/1984 | | |
| JP | S61129383 A | 6/1986 | | |
| JP | S62189293 U | 12/1987 | | |
| JP | S63129688 U | 8/1988 | | |
| JP | S6363432 B2 | 12/1988 | | |
| JP | H01175989 U | 12/1989 | | |
| JP | H0431917 B2 | 5/1992 | | |
| JP | H0581477 B2 | 11/1993 | | |
| JP | H075109 B2 | 1/1995 | | |
| JP | H10167145 A | 6/1998 | | |
| JP | 2001172796 A | 6/2001 | | |
| JP | 3933314 B2 | 6/2007 | | |
| JP | 4015265 B2 | 11/2007 | | |
| JP | 2008-1365 | * | 1/2008 | B62K 11/04 |
| JP | 2010083380 A | 4/2010 | | |
| JP | 2012-192773 | * | 10/2012 | B62K 11/02 |
| JP | 2013103565 A | 5/2013 | | |
| JP | 5295688 B2 | 9/2013 | | |
| JP | 6158943 B2 | 7/2017 | | |
| JP | 2018058391 A | 4/2018 | | |
| JP | 6459554 B2 | 1/2019 | | |
| TW | 539640 B | 7/2003 | | |

OTHER PUBLICATIONS

Office Action in the couterpart Taiwanese patent application (109134751) dated Jun. 3, 2021.
Office Action in the couterpart Indian patent application (202024043271) dated Jun. 4, 2021.
Decision to Grant a Patent in the counterpart Chinese application No. 202011077629.8 dated Mar. 11, 2022.
Extended European Search Report in the counterpart European patent application (20200496.6) dated Feb. 10, 2021.
Schultz, "Chater 1 Delta-11—Building the Worlds Most Efficient, Practical Motorcycle Schultz Engineering, LLC 2011 Concept Vehicle Delta-11tm—Developing the Worlds Most Efficient, Practical Electric Motorcycle". Oct. 6, 2011.

* cited by examiner

STRADDLED VEHICLE

CROSS REFERENCE TO RELATED APPLICATIONS

This application is based upon and claims the benefit of priority of the prior Japanese Patent Application No. 2019-188039, filed on Oct. 11, 2019, the entire contents of which are incorporated herein by reference.

BACKGROUND

Technical Field

The present invention relates to a straddled vehicle including a body frame.

Description of Related Art

An element that affects riding comfort of the straddled vehicle includes rigidity of a body frame. In a case where rigidity of the body frame is set high, for example, deformation of the body frame is suppressed. Thus, stable riding comfort can be obtained. However, in a case where rigidity of the body frame is set excessively high, operating the straddled vehicle may require skill in order to keep the speed high at the time of turning of the vehicle.

Rigidity of the body frame is desirably adjustable in order to obtain desired riding comfort. In regard to such a request, JP 2013-103565 A describes one example of the structure in which rigidity of a frame of a straddled vehicle is adjustable.

Specifically, the frame structure described in JP 2013-103565 A includes a head pipe, a main frame, a down frame and a bridge. A first fixing portion is provided at the main frame. Further, a second fixing portion is provided at the down frame. The bridge is configured to be attachable to and detachable from the main frame and the down frame to connect the first and second fixing portions to each other. In this case, it is possible to change strength of the entire frame structure by changing a cross sectional shape of the bridge, changing a material of the bridge, etc.

SUMMARY

In the following description, the configuration of the frame structure described in JP 2013-103565 A except for the bridge is referred to as a body frame. As described above, it is considered that a common body frame can be used for a plurality of types of straddled vehicles in a case where it is possible to change riding comfort of the straddled vehicle by suitably changing a bridge depending on a body frame. In this case, the plurality of types of straddled vehicles can be manufactured at low cost.

However, in the above-mentioned frame structure, there is a limit to the degree of riding comfort which is adjustable by changing the shape and material of the bridge, etc. Therefore, it may not be possible to realize riding comfort required for the type of a straddled vehicle depending on the type of the straddled vehicle.

An object of the present invention is to enable manufacture of a plurality of types of straddled vehicles at low cost and provide a straddled vehicle that can realize appropriate riding comfort depending on a type of the straddled vehicle.

(1) A straddled vehicle according to one aspect of the present invention includes a body frame having a head pipe and a pair of left and right main rails that is formed to extend rearwardly and downwardly from the head pipe while spreading in a left-and-right direction, a first coupling member that couples front portions of the left and right main rails extending rearwardly and outwardly from the head pipe in a plan view of the vehicle to each other, a second coupling member that couples middle portions of the left and right main rails in a front-and-rear direction to each other in the plan view of the vehicle, a third coupling member that couples rear end portions of the left and right main rails to each other, an engine supported by the body frame, a drive wheel rotated by the engine, a rear arm provided to extend rearwardly of the vehicle from a position farther downward than the second coupling member and farther upward than the third coupling member of the body frame in a side view of the vehicle and rotatably supports the drive wheel, and a rear suspension connected to the second coupling member so as to at least partially absorb shock transmitted from the drive wheel to the rear arm, wherein the first coupling member has first and second end portions respectively connected to the front portions of the left and right main rails with a plurality of first bolts, the second coupling member has third and fourth end portions respectively connected to the middle portions of the left and right main rails with a plurality of second bolts, and the third coupling member has fifth and sixth end portions respectively connected to the rear end portions of the left and right main rails with a plurality of third bolts.

In the straddled vehicle, the engine is supported by the body frame. When a user is driving the vehicle, various types of loads are applied to the body frame. For example, in the body frame, a force that makes the left and right main rails to move away from each other or a force that brings the left and right main rails closer to each other is applied between the left and right main rails in order to fix the engine at the body frame against an inertial force generated during traveling of the vehicle.

In a case where the body frame has high rigidity with respect to the force that is applied between the left and right main rails, the body frame is unlikely to be deformed. On the other hand, in a case where the body frame has low rigidity with respect to the force that is applied between the left and right main rails, the body frame is likely to be deformed. The degree of deformation affects riding comfort of the straddled vehicle.

Further, at least part of the shock transmitted from the drive wheel to the rear arm is absorbed by the rear suspension. The rear suspension is connected to the second coupling member. In this case, the shock that cannot be completely absorbed by the rear suspension is transmitted to the second coupling member. In a case where rigidity of the second coupling member is high with respect to the shock transmitted to the second coupling member, the second coupling member is unlikely to be deformed. On the other hand, in a case where rigidity of the second coupling member is low with respect to the shock transmitted to the second coupling member, the second coupling member is likely to be deformed. The degree of deformation of the second coupling member affects riding comfort of the straddled vehicle.

With the above-mentioned configuration, the front portions of the left and right main rails are coupled to each other by the first coupling member, the middle portions of the left and right main rails are coupled to each other by the second coupling member, and the rear end portions of the left and right main rails are coupled to each other by the third coupling member. Further, these members are connected to the body frame with the plurality of first to third bolts. Therefore, it is possible to easily obtain desired rigidity in regard to each component of the body frame by suitably adjusting the shape and material of the first to third coupling members and attaching the first to third coupling members to the body frame. Thus, desired riding comfort in the straddled vehicle is realized.

Further, in this case, it is possible to manufacture a plurality of types of straddled vehicles using a common body frame by preparing the first to third coupling members depending on the required riding comfort.

As a result, the plurality of types of straddled vehicles can be manufactured at low cost, and the rider can obtain appropriate riding comfort depending on the type of a straddled vehicle.

(2) The front portion of the left main rail may have a first attachment portion that is capable of supporting the first end portion of the first coupling member and directed upwardly, the front portion of the right main rail may have a second attachment portion that is capable of supporting the second end portion of the first coupling member and directed upwardly, one or a plurality of first screw holes to which a part of the plurality of first bolts is attachable may be formed in the first attachment portion to be directed upwardly, one or a plurality of second screw holes to which a remaining first bolt out of the plurality of first bolts is attachable may be formed in the second attachment portion to be directed upwardly, one or a plurality of first through holes corresponding to the one or plurality of first screw holes may be formed in the first end portion of the first coupling member, one or a plurality of second through holes corresponding to the one or plurality of second screw holes may be formed in the second end portion of the first coupling member, and the part of the plurality of first bolts may be attached to the one or plurality of first screw holes through the one or plurality of first through holes, and the remaining first bolt out of the plurality of first bolts may be attached to the one or plurality of second screw holes through the one or plurality of second through holes, with the first and second end portions of the first coupling member respectively supported on the first and second attachment portions of the body frame.

In this case, the first coupling member can be easily attached to the body frame from a position farther upward than the body frame.

(3) One or a plurality of third screw holes to which a part of the plurality of second bolts is attachable may be formed in the third end portion of the second coupling member to be directed leftwardly, one or a plurality of fourth screw holes to which a remaining second bolt out of the plurality of second bolts is attachable may be formed in the fourth end portion of the second coupling member to be directed rightwardly, one or a plurality of third through holes corresponding to the one or plurality of third screw holes may be formed in the middle portion of the left main rail, one or a plurality of fourth through holes corresponding to the one or plurality of fourth screw holes may be formed in the middle portion of the right main rail, and the part of the plurality of second bolts may be attached to the one or plurality of third screw holes through the one or plurality of third through holes from a position farther leftward than the body frame, and the remaining second bolt out of the plurality of second bolts may be attached to the one or plurality of fourth screw holes through the one or plurality of fourth through holes from a position farther rightward than the body frame, with the second coupling member arranged between the left and right middle portions of the body frame such that the third end portion of the second coupling member is directed leftwardly and the fourth end portion of the second coupling member is directed rightwardly.

In this case, the second coupling member can be easily attached to the body frame from a position farther rightward than the body frame and a position farther leftward than the body frame.

(4) One or a plurality of fifth screw holes to which a part of the plurality of third bolts is attachable may be formed in the fifth end portion of the third coupling member to be directed leftwardly, one or a plurality of sixth screw holes to which a remaining third bolt out of the plurality of third bolts is attachable may be formed in the sixth end portion of the third coupling member to be directed rightwardly, one or a plurality of fifth through holes corresponding to the one or plurality of fifth screw holes may be formed in the rear end portion of the left main rail, one or a plurality of sixth through holes corresponding to the one or plurality of sixth screw holes may be formed in the rear end portion of the right main rail, and the part of the plurality of third bolts may be attached to the one or plurality of fifth screw holes from a position farther leftward than the body frame through the one or plurality of fifth through holes, and the remaining third bolt out of the plurality of third bolts may be attached to the one or plurality of sixth screw holes from a position farther rightward than the body frame through the one or plurality of sixth through holes, with the third coupling member arranged between the left and right rear end portions of the body frame such that the fifth end portion of the third coupling member is directed leftwardly and the sixth end portion of the third coupling member is directed rightwardly.

In this case, the third coupling member can be easily attached to the body frame from a position farther rightward than the body frame and a position farther left ward than the body frame.

(5) The straddled vehicle may further include a first link member having first, second and third portions, and a second link member having fourth and fifth portions, wherein the rear suspension may have seventh and eighth end portions, the seventh end portion of the rear suspension may be connected to the second coupling member, the first portion of the first link member may be connected to the eighth end portion of the rear suspension, the second portion of the first link member may be connected to the rear arm, the fourth portion of the second link member may be connected to the third portion of the first link member, and the fifth portion of the second link member may be connected to the third coupling member.

In this case, the shock transmitted from the drive wheel to the rear arm is appropriately absorbed by the rear suspension. Further, in this case, the shape and material of the first and second link members are adjusted, whereby flexibility of realizable riding comfort is improved.

(6) The straddled vehicle may further include a left engine bracket that supports the engine at a left main frame, and a right engine bracket that supports the engine at a right main frame, wherein the left engine bracket is attached to the left main rail and connected to a left portion of the engine with a plurality of fourth bolts, and the right engine bracket is attached to the right main rail and connected to a right portion of the engine with a plurality of fifth bolts.

In this case, the left and right engine brackets support the engine that tilts in the vehicle left-and-right direction during turning of the vehicle. Therefore, in a case where having high rigidity, each engine bracket is unlikely to be deformed. On the other hand, in a case where having low rigidity, each engine bracket is likely to be deformed. The degree of deformation affects riding comfort of the straddled vehicle.

With the above-mentioned configuration, the left and right engine brackets are connected to the body frame and the engine with the plurality of fourth and fifth bolts. Therefore, desired riding comfort in the straddled vehicle is realized by adjustment of the shape and material of the left and right engine brackets.

Other features, elements, characteristics, and advantages of the present disclosure will become more apparent from the following description of preferred embodiments of the present disclosure with reference to the attached drawings.

DETAILED DESCRIPTION

A straddled vehicle according to one embodiment of the present invention will be described below with reference to the drawings. A motorcycle will be explained as one example of the straddled vehicle.

[1] Schematic Configuration of Motorcycle

Figure 1:
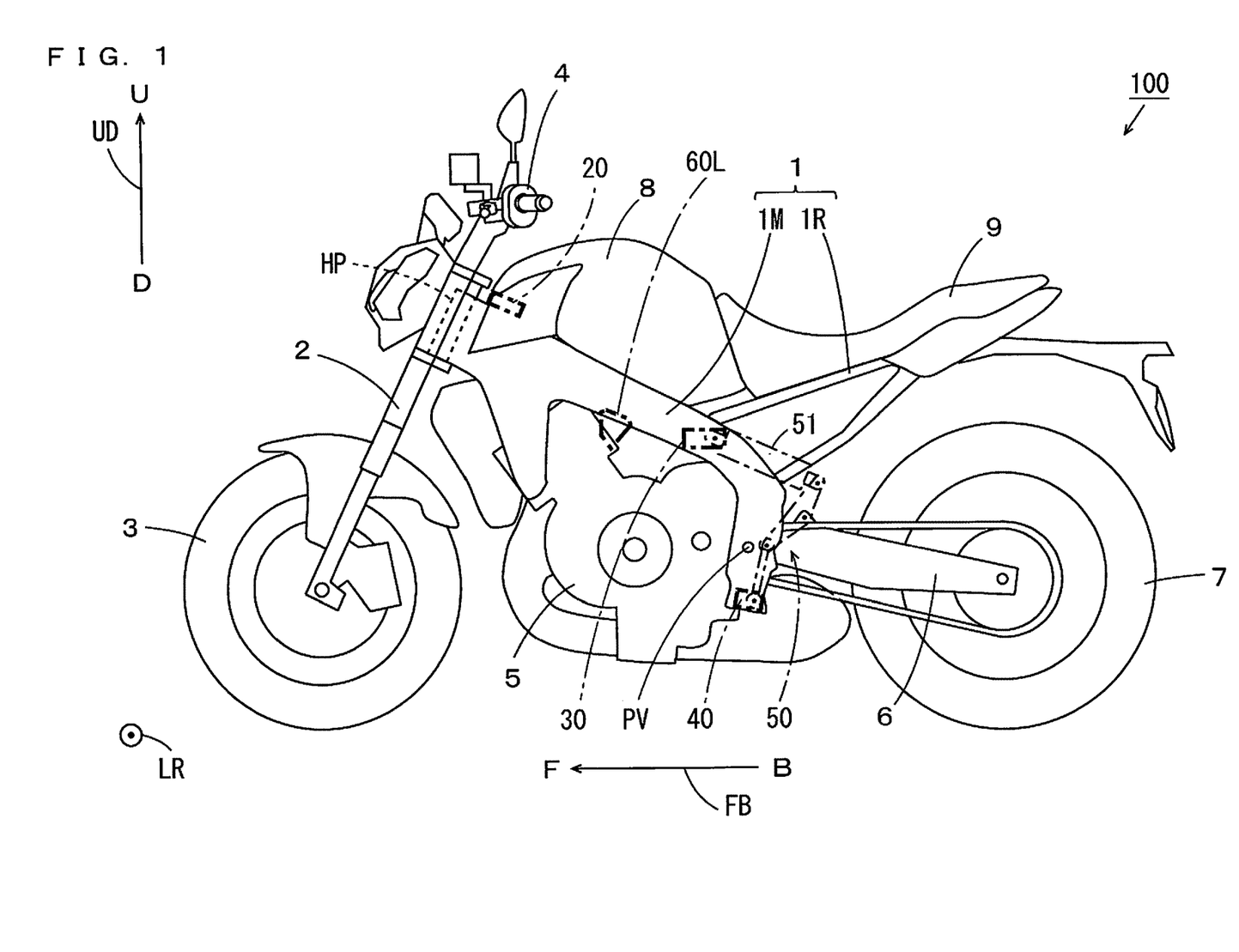
FIG. 1 is a side view of a motorcycle according to one embodiment of the present invention.

FIG. 1 is a side view of the motorcycle according to the one embodiment of the present invention. In FIG. 1, the motorcycle 100 standing up to be perpendicular to the road surface is shown. In each of FIG. 1 and subsequent given diagrams, a front-and-rear direction FB, a left-and-right direction LR and an up-and-down direction UD of the motorcycle 100 are suitably indicated by the arrows. The direction in which the arrow is directed in the front-and-rear direction FB is referred to as forward, and its opposite direction is referred to as rearward. Further, the direction in which the arrow is directed in the left-and-right direction LR is referred to as leftward, and its opposite direction is referred to as rightward. Further, the direction in which the arrow is directed in the up-and-down direction UD is referred to as upward, and its opposite direction is referred to as downward. In each of FIG. 1 and subsequent given diagrams, forward, rearward, leftward, rightward, upward and downward are indicated by reference characters F, B, L, R, U and D, respectively.

The motorcycle 100 of FIG. 1 includes a metallic body frame 1. The body frame 1 includes a main frame 1M and a rear frame 1R. The front end of the main frame 1M constitutes a head pipe HP. The main frame 1M is formed to extend rearwardly and downwardly from the head pipe HP. First, second and third coupling members 20, 30, 40 and left and right engine brackets 60L, 60R (FIG. 4) are attached to the main frame 1M. In FIG. 1, only the left engine bracket 60L out of the left and right engine brackets 60L, 60R is shown.

The first, second and third coupling members 20, 30, 40 are provided to ensure rigidity required of each part of the main frame 1M. The left and right engine brackets 60L, 60R are provided to support the engine 5 at the main frame 1M. These members affect riding comfort of the motorcycle 100. In the following description, the first, second and third coupling members 20, 30, 40 and the left and right engine brackets 60L, 60R are suitably and collectively referred to as frame attachment members.

The rear frame 1R is attached to the main frame 1M so as to extend rearwardly and slightly upwardly from the rear end portion of the main frame 1M and its vicinity.

A front fork 2 is provided at the head pipe HP to be swingable in the left-and-right direction LR. A front wheel 3 is rotatably supported at the lower end of the front fork 2. A handle 4 is provided at the upper end of the front fork 2.

The main frame 1M supports an engine 5 at a position farther downward than the head pipe HP. A fuel tank 8 is provided to be located upwardly of the engine 5 and rearwardly of the head pipe HP. A seat 9 is provided rearwardly of the fuel tank 8. The fuel tank 8 is supported by the main frame 1M and located above the main frame 1M. The seat 9 is mainly supported by the rear frame 1R and located above the rear frame 1R.

A rear arm 6 is provided to extend rearwardly from a lower portion of the main frame 1M. The rear arm 6 is supported at the main frame 1M via a pivot shaft PV. A rear wheel 7 is rotatably supported at the rear end portion of the rear arm 6. The rear wheel 7 is rotated as a drive wheel by motive power generated by the engine 5.

A shock-absorbing mechanism 50 for absorbing shock transmitted from the rear wheel 7 to the rear arm 6 during traveling of the vehicle is provided in the rear half portion of the main frame 1M. The shock-absorbing mechanism 50 includes a rear suspension 51. Details of the shock-absorbing mechanism 50 will be described below.

[2] Main Frame 1M

Figure 2:
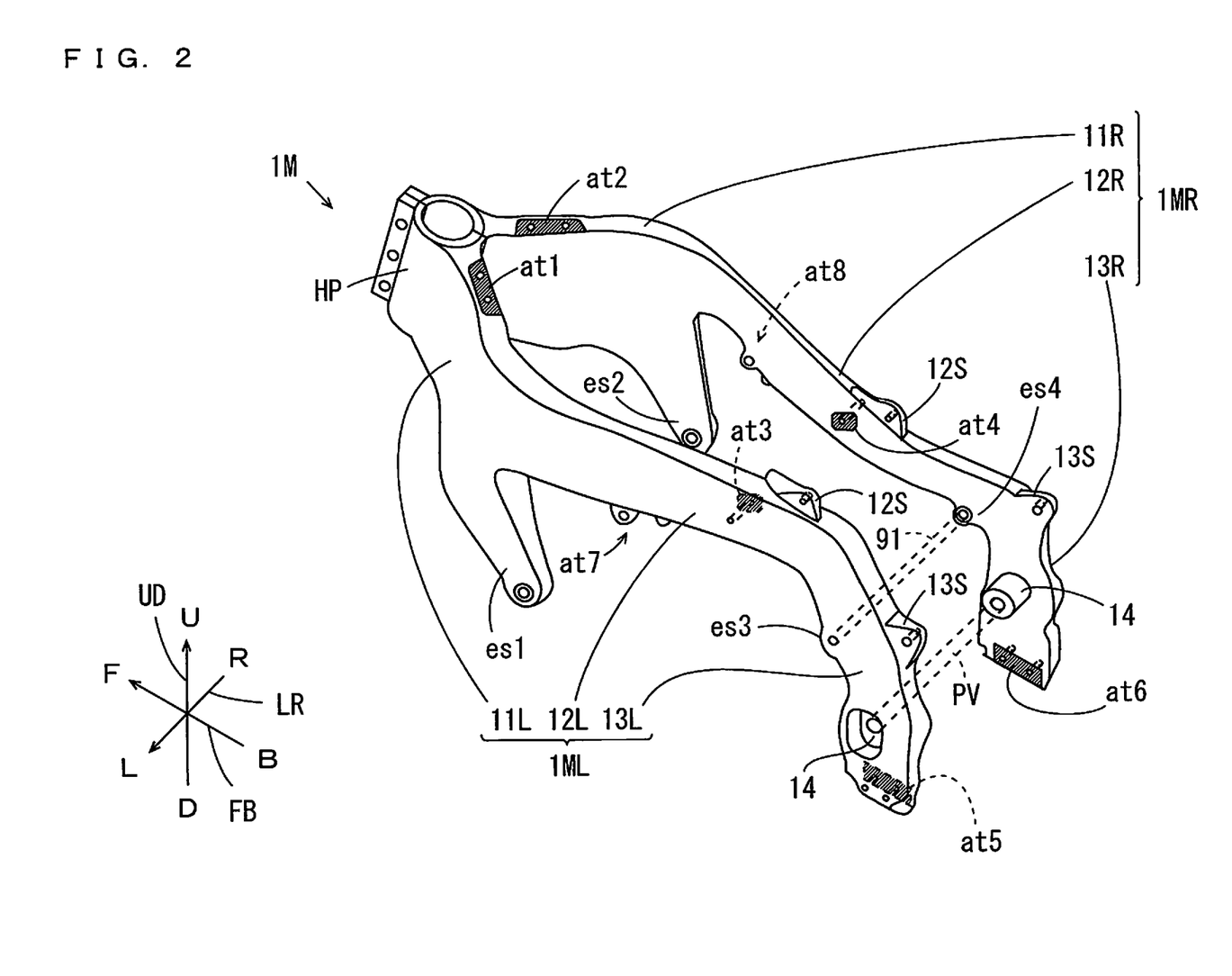
FIG. 2 is an external perspective view for explaining the configuration of a main frame of FIG. 1.

FIG. 2 is an external perspective view for explaining the configuration of the main frame 1M of FIG. 1. As shown in FIG. 2, the main frame 1M has a pair of left and right main rails 1ML, 1MR. One end of the left main rail 1ML and one end of the right main rail 1MR are connected to each other with a plurality of bolts and nuts. Thus, the head pipe HP is formed.

The left and right main rails 1ML, 1MR have front portions 11L, 11R, middle portions 12L, 12R and rear portions 13L, 13R, respectively. The left and right front portions 11L, 11R extend rearwardly and downwardly from the head pipe HP while spreading in the left-and-right direction LR. An engine supporting portion es1 is provided in a lower portion of the left front portion 11L to extend downwardly. Further, a first attachment portion at1 that can support the first coupling member 20 of FIG. 1 is formed in an upper portion of the left front portion 11L to be directed upwardly. A plurality (two in the present example) of screw holes that are directed upwardly are formed in the first attachment portion at1. Each screw hole of the first attachment portion at1 corresponds to a first screw hole.

An engine supporting portion es2 is provided in a lower portion of the right front portion 11R to extend downwardly. Further, a second attachment portion at2 that can support the first coupling member 20 of FIG. 1 is formed in an upper portion of the right front portion 11R to be directed upwardly. A plurality (two in the present example) of screw holes that are directed upwardly are formed in the second attachment portion at2. Each screw hole of the second attachment portion at2 corresponds to a second screw hole.

The left and right middle portions 12L, 12R further extend rearwardly and downwardly from the rear ends of the left and right front portions 11L, 11R. A bracket attachment portion at7 for attaching the engine bracket 60L of FIG. 1 is formed in a lower portion of the left middle portion 12L. A plurality (two in the present example) of screw holes penetrating in the left-and-right direction LR are formed in the bracket attachment portion at7. A frame connecting portion 12S for connecting the rear frame 1R of FIG. 1 to the left middle portion 12L is formed at an upper portion of the left middle portion 12L. One through hole penetrating in the left-and-right direction LR is formed in the left frame connecting portion 12S. Further, a third attachment portion at3 that can support the second coupling member 30 of FIG. 1 is formed at the right side surface of the left middle portion 12L. One through hole penetrating in the left-and-right direction LR is formed in the third attachment portion at3. The through hole of the third attachment portion at3 corresponds to a third through hole.

A bracket attachment portion at8 for attaching the right engine bracket 60R is formed in a lower portion of the right middle portion 12R. A plurality (two in the present example) of screw holes penetrating in the left-and-right direction LR are formed in the bracket attachment portion at8. A frame connecting portion 12S for connecting the rear frame 1R of FIG. 1 to the right middle portion 12R is formed at an upper portion of the right middle portion 12R. One through hole penetrating in the left-and-right direction LR is formed in the right frame connecting portion 12S. Further, a fourth attachment portion at4 that can support the second coupling member 30 of FIG. 1 is formed at the left side surface of the right middle portion 12R. One through hole penetrating in the left-and-right direction LR is formed in the fourth attachment portion at4. The through hole of the fourth attachment portion at4 corresponds to a fourth through hole. The third and fourth attachment portions at3, at4 are opposite to each other in the left-and-right direction LR.

The left and right rear portions 13L, 13R are located in the rear end portions of the body frame 1 and extend downwardly from the rear ends of the left and right middle portions 12L, 12R. A shaft connecting portion es3 for connecting one end of an engine support shaft 91 that supports the engine 5 of FIG. 1 to the left rear portion 13L is formed at a front upper end of the left rear portion 13L. A frame connecting portion 13S for connecting the rear frame 1R of FIG. 1 to the left rear portion 13L is formed at a rear upper end of the left rear portion 13L. One through hole penetrating in the left-and-rear direction LR is formed in the left frame connecting portion 13S. Further, a shaft connecting portion 14 for connecting one end of a pivot shaft PV to the left rear portion 13L is formed in substantially the center of the left rear portion 13L in the up-and-down direction UD. Further, a fifth attachment portion at5 that can support the third coupling member 40 of FIG. 1 is formed at the right side surface of the lower end of the left rear portion 13L. A plurality (two in the present example) of through holes penetrating in the left-and-right direction LR are formed in the fifth attachment portion at5. Each through hole of the fifth attachment portion at5 corresponds to a fifth through hole.

A shaft connecting portion es4 for connecting the other end of the engine support shaft 91 that supports the engine 5 of FIG. 1 to the right rear portion 13R is formed at a front upper end of the right rear portion 13R. Further, a frame connecting portion 13S for connecting the rear frame 1R of FIG. 1 to the right rear portion 13R is formed at a rear upper end of the right rear portion 13R. One through hole penetrating in the left-and-right direction LR is formed in the right frame connecting portion 13S. Further, a shaft connecting portion 14 for connecting the other end of the pivot shaft PV to the right rear portion 13R is formed in substantially the center of the right rear portion 13R in the up-and-down direction UD. Further, a sixth attachment portion at6 that can support the third coupling member 40 of FIG. 1 is formed at the left side surface of the lower end of the right rear portion 13R. A plurality (two in the present example) of through holes penetrating in the left-and-right direction LR are formed in the sixth attachment portion at6. Each through hole of the sixth attachment portion at6 corresponds to sixth through holes. The fifth and sixth attachment portions at5, at6 are opposite to each other in the left-and-right direction LR.

In FIG. 2, hatching is applied to the first to sixth attachment portions at1 to at6 in order to facilitate understanding of the positions and size of the first to sixth attachment portions at1 to at6. Further, in FIG. 2, the engine support shaft 91 connected between the shaft connecting portions es3, es4 of the rear portions 13L, 13R is indicated by the dotted lines. Further, the pivot shaft PV connected between the two shaft connecting portions 14 of the rear portions 13L, 13R is indicated by the dotted lines.

[3] Frame Attachment Members

Figure 3:
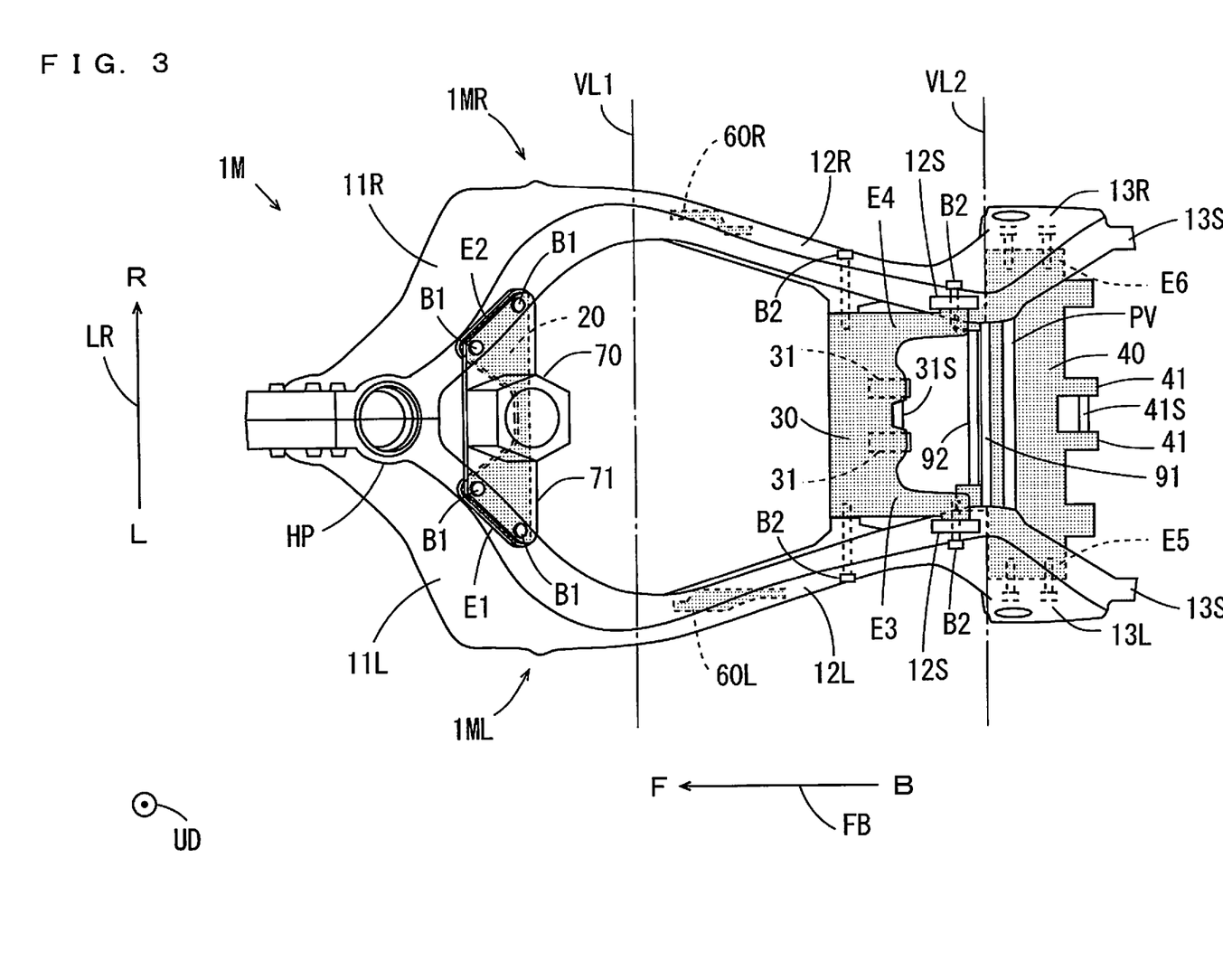
FIG. 3 is a schematic plan view showing a plurality of frame attachment members attached to the main frame of FIG. 2.
Figure 4:
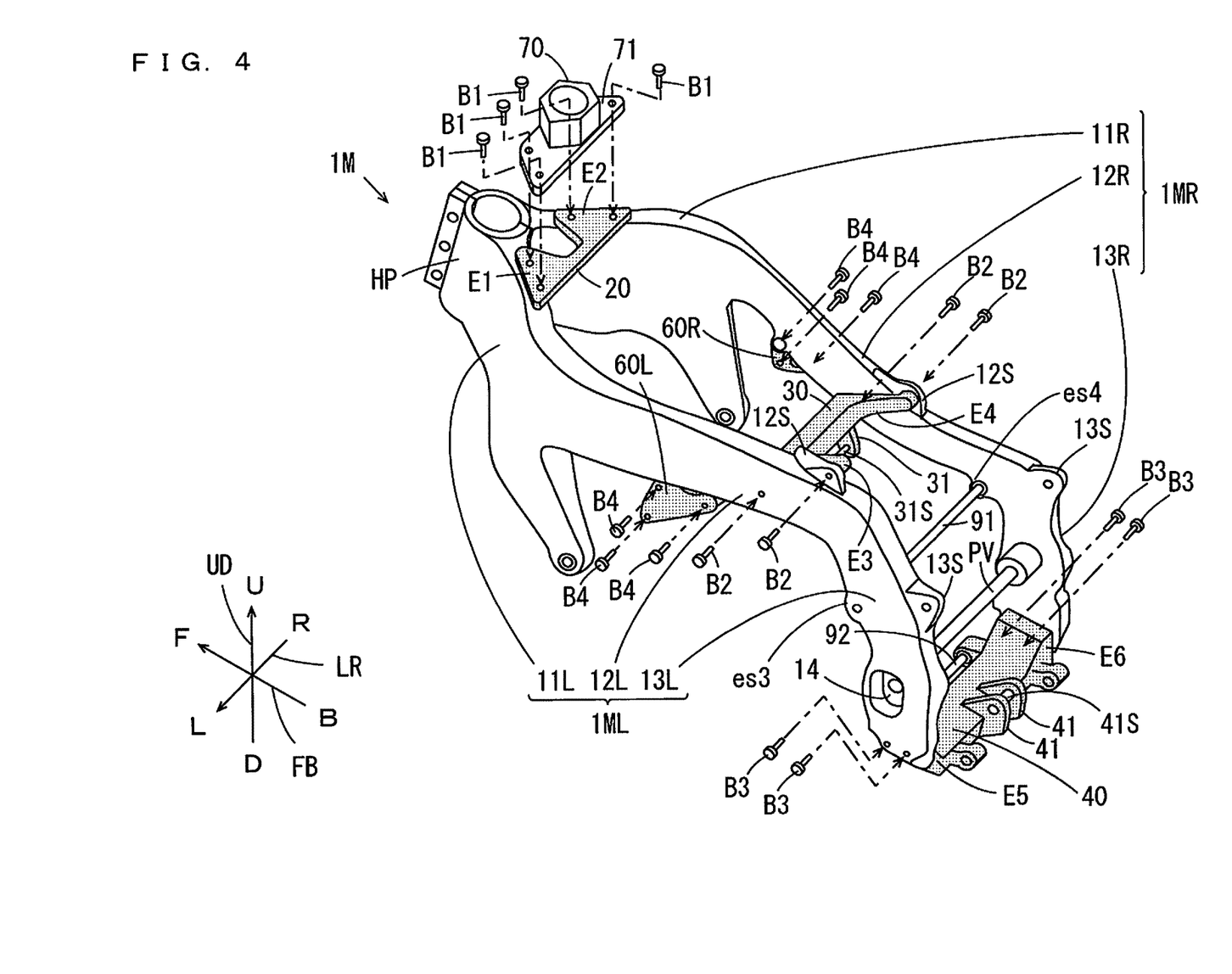
FIG. 4 is a schematic external perspective view showing the plurality of frame attachment members attached to the main frame of FIG. 2.

FIGS. 3 and 4 are a schematic plan view and a schematic external perspective view showing the plurality of frame attachment members attached to the main frame 1M of FIG. 2. In FIGS. 3 and 4, a dotted pattern is applied to each frame attachment member in order to facilitate understanding of the shape and attachment state of each of the frame attachment members. Further, in FIG. 3, the boundary between the front portions 11L, 11R and the middle portions 12L, 12R of the left and right main rails 1ML, 1MR is indicated by a virtual line VL1. The boundary between the middle portions 12L, 12R and the rear portions 13L, 13R is indicated by a virtual line VL2.

As shown in FIG. 3, the upper ends of the left and right front portions 11L, 11R extend rearwardly from the head pipe HP while spreading in the left-and-right direction LR in a plan view of the vehicle. Further, the upper ends of the left and right middle portions 12L, 12R extend rearwardly from the rear ends of the front portions 11L, 11R while narrowing in the left-and-right direction LR in a plan view of the vehicle. Further, the upper ends of the left and right rear portions 13L, 13R further extend rearwardly from the rear ends of the middle portions 12L, 12R while spreading in the left-and-right direction LR in a plan view of the vehicle.

The first coupling member 20 has first and second end portions E1, E2. A plurality of through holes respectively corresponding to the plurality screw holes formed in the first and second attachment portions at1, at2 of FIG. 2 are formed in the first and second end portions E1, E2. Each through hole of the first end portion E1 corresponds to a first through hole, and each through hole of the second end portion E2 corresponds to a second through hole. The first and second end portions E1, E2 of the first coupling member 20 are respectively supported on the first and second attachment portions at1, at2 of FIG. 2. At this time, the first coupling member 20 is positioned such that the plurality of through holes of the first and second end portions E1, E2 overlap with the plurality of screw holes of the first and second attachment portions at1, at2 in the up-and-down direction UD.

A cylinder holding member 70 is further provided on the first coupling member 20 of the present example. The cylinder holding member 70 is configured to be capable of holding a key cylinder and a handle lock and has a flange portion 71 at its bottom end. In the flange portion 71, a plurality of through holes respectively corresponding to the plurality of screw holes of the first and second attachment portions at1, at2 of FIG. 2 are formed similarly to the first coupling member 20.

As shown in FIG. 4, the cylinder holding member 70 is positioned such that the plurality of through holes of the flange portion 71 overlap with the plurality of through holes of the first coupling member 20 in the up-and-down direction UD. In this state, a plurality of bolts B1 are attached from above to the plurality of screw holes of the first and second attachment portions at1, at2 of FIG. 2 through the plurality of through holes of the flange portion 71 and the plurality of through holes of the first coupling member 20. Thus, the left and right front portions 11L, 11R of the main frame 1M are easily coupled to each other by the first coupling member 20.

As shown in FIG. 3, the second coupling member 30 is provided to couple the third and fourth attachment portions at3, at4 of FIG. 2 to each other and has third and fourth end portions E3, E4. The third end portion E3 is supported by the third attachment portion at3 of FIG. 2, and the fourth end portion E4 is supported by the fourth attachment portion at4.

In the left side surface of the third end portion E3, a plurality of screw holes respectively corresponding to the through hole formed in the third attachment portion at3 and the through hole formed in the left frame connecting portion 12S of FIG. 2 are formed to be directed leftwardly. At least one of the plurality of through holes of the third end portion E3 corresponds to a third screw hole. In the right side surface of the fourth end portion E4, a plurality of screw holes respectively corresponding to the through hole formed in the fourth attachment portion at4 and the through hole formed in the right frame connecting portion 12S of FIG. 2 are formed to be directed rightwardly. At least one of the plurality of screw holes of the fourth end portion E4 corresponds to a fourth screw hole.

As shown in FIG. 3, the second coupling member 30 is arranged between the middle portions 12L, 12R. At this time, the third end portion E3 is positioned such that the plurality of screw holes of the third end portion E3 overlap with the through hole of the third attachment portion at3 and the through hole of the left frame connecting portion 12S of FIG. 2 in the left-and-right direction LR. Further, the fourth end portion E4 is positioned such that the plurality of screw holes of the fourth end portion E4 overlap with the through hole of the fourth attachment portion at4 and the through hole of the right frame connecting portion 12S of FIG. 2 in the left-and-right direction LR.

In this state, a plurality of bolts B2 are attached from the left to the plurality of screw holes of the third end portion E3 through the through hole of the third attachment portion at3 and the through hole of the left frame connecting portion 12S of FIG. 2. Further, a plurality of bolts B2 are attached to the plurality of screw holes of the fourth end portion E4 from the right through the through hole of the fourth attachment portion at4 and the through hole of the right frame connecting portion 12S of FIG. 2. Thus, the left and right middle portions 12L, 12R of the main frame 1M are easily coupled to each other by the second coupling member 30.

At the rear end of the second coupling member 30, a pair of left and right shaft supporting portions 31 is provided to project downwardly and be spaced apart from each other. A link shaft 31S is provided between the left and right shaft supporting portions 31 to extend in the left-and-right direction LR. Details of the link shaft 31S will be described below.

As shown in FIG. 3, the third coupling member 40 is provided to couple the fifth and sixth attachment portions at5, at6 of FIG. 2 to each other and has fifth and sixth end portions E5, E6. The fifth end portion E5 is supported by the fifth attachment portion at5, and the sixth end portion E6 is supported by the sixth attachment portion at6.

In the left side surface of the fifth end portion E5, a plurality of screw holes respectively corresponding to the plurality of through holes formed in the fifth attachment portion at5 of FIG. 2 are formed to be directed leftwardly. Each screw hole of the fifth end portion E5 corresponds to a fifth screw hole. In the right side surface of the sixth end portion E6, a plurality of screw holes respectively corresponding to the plurality of through holes formed in the sixth attachment portion at6 of FIG. 2 are formed to be directed rightwardly. Each screw hole of the sixth end portion E6 corresponds to a sixth screw hole.

As shown in FIG. 4, the third coupling member 40 is arranged between the lower ends of the rear portions 13L, 13R. At this time, the fifth end portion E5 is positioned such that the plurality of screw holes of the fifth end portion at5 overlap with the plurality of through holes of the fifth attachment portion at5 of FIG. 2 in the left-and-right direction LR. Further, the sixth end portion E6 is positioned such that the plurality of screw holes of the sixth end portion E6 overlap with the plurality of through holes of the sixth attachment portion at6 of FIG. 2 in the left-and-right direction LR. In this state, a plurality of bolts B3 are attached from the left to the plurality of screw holes of the fifth end portion E5 through the plurality of through holes of the fifth attachment portion at5 of FIG. 2. Further, a plurality of bolts B3 are attached from the right to the plurality of screw holes of the sixth end portion E6 through the plurality of through holes of the sixth attachment portion at6 of FIG. 2. Thus, the left and right rear portions 13L, 13R of the main frame 1M are easily coupled to each other by the third coupling member 40.

At the front end of the third coupling member 40, an engine support shaft 92 for supporting the lower end portion of the engine 5 is integrally provided to extend in the left-and-right direction LR. At the rear end of the third coupling member 40, a pair of left and right shaft supporting portions 41 is provided to be spaced part from each other and project upwardly. A link shaft 41S is provided between the left and right shaft supporting portions 41 to extend in the left-and-right direction LR. Details of the link shaft 41S will be described below.

As shown in FIG. 4, the left engine bracket 60L is constituted by a planer member having a plurality (three in the present example) of through holes. The engine bracket 60L is positioned leftwardly of the bracket attachment portion at7 such that parts of the through holes overlap with the plurality of screw holes of the bracket attachment portion at7 of FIG. 2 in the left-and-right direction LR. In this state, a plurality of bolts B4 are attached from the left to the plurality of screw holes of the bracket attachment portion at7 of FIG. 2 through the parts of the through holes of the engine bracket 60L.

The right engine bracket 60R basically has the same configuration as the left engine bracket 60L. Thus, the engine bracket 60R is positioned rightwardly of the bracket attachment portion at8 such that parts of the through holes overlap with the plurality of screw holes of the bracket attachment portion at8 of FIG. 2. In this state, a plurality of bolts B4 are attached from the right to the plurality of screw holes of the bracket attachment portion at8 of FIG. 2 through the parts of the plurality of through holes of the engine bracket 60R.

[4] Supporting State of Engine 5 by Main Frame 1M

Figure 5:
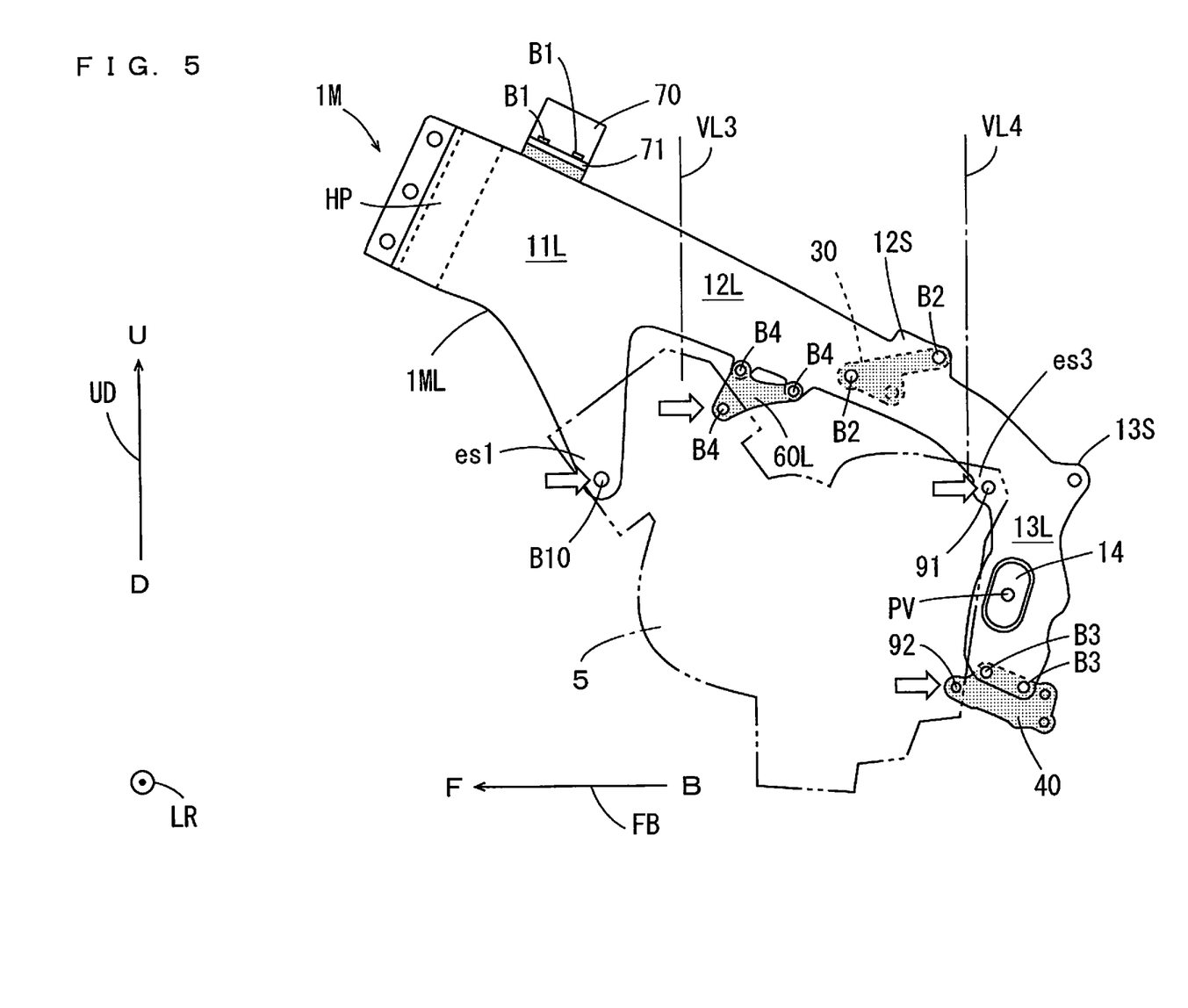
FIG. 5 is a schematic left side view showing the plurality of frame attachment members attached to the main frame of FIG. 2.

FIG. 5 is a schematic left side view showing a plurality of frame attachment members attached to the main frame 1M of FIG. 2. In FIG. 5, the engine 5 is indicated by the two-dots and dash line. Further, the boundary between the front portion 11L and the middle portion 12L of the left main rail 1ML is indicated by the virtual line VL3. The boundary between the middle portion 12L and the rear portion 13L is indicated by the virtual line VL4.

In the present embodiment, as indicated by the outlined arrows in FIG. 5, the engine 5 is supported by connection of the four portions to the main frame 1M in a side view of the vehicle. Specifically, the portion in the vicinity of the front end of the left side surface of the engine 5 is connected to the engine supporting portion es1 with a bolt B10. Further, the portion in the vicinity of the front end of the right side surface of the engine 5 (not shown) is connected to the engine supporting portion es2 of FIG. 2 with a bolt.

Further, the portion in the vicinity of the upper end of the left side surface of the engine 5 is connected to the engine bracket 60L with a bolt B4. Further, the portion in the vicinity of the upper end of the right side surface of the engine 5 (not shown) is connected to the engine bracket 60R of FIG. 4 with a bolt B4.

Further, the portion at the rear end and above the engine 5 is connected to the engine support shaft 91 that is connected between the shaft connecting portions es3, es4 of FIG. 4. Further, the portion at the rear end and below the engine 5 is connected to the engine support shaft 92 provided at the third coupling member 40.

[5] Shock-Absorbing Mechanism 50

Figure 6:
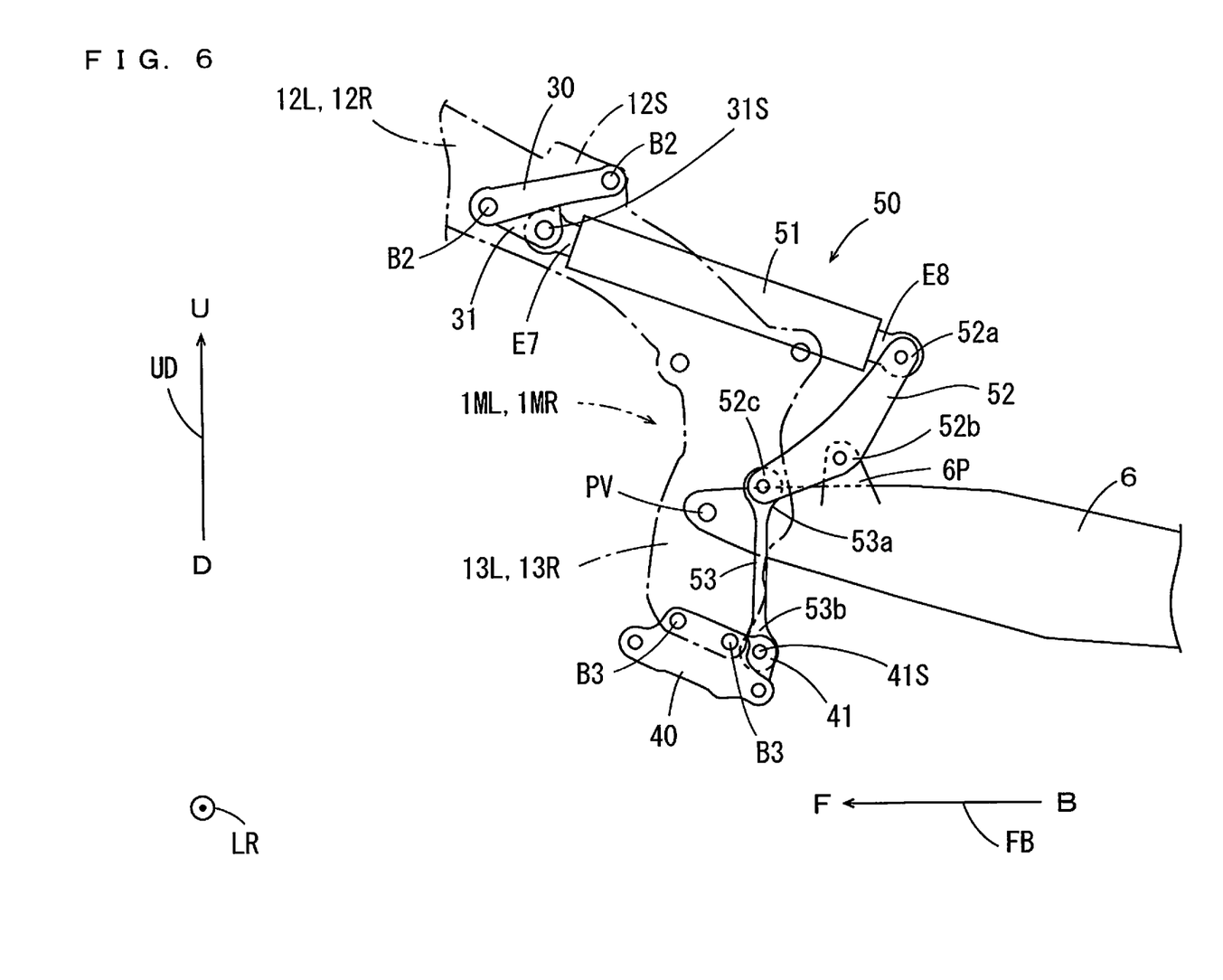
FIG. 6 is a schematic enlarged side view for explaining the details of a shock-absorbing mechanism of FIG. 1.

FIG. 6 is a schematic enlarged side view for explaining the details of the shock-absorbing mechanism 50 of FIG. 1. In FIG. 6, the main frame 1M is indicated by the one-dot and dash line.

As shown in FIG. 6, the shock-absorbing mechanism 50 includes the rear suspension 51, a first link member 52 and a second link member 53. The rear suspension 51 is provided to extend obliquely downwardly from a front portion of the vehicle to a rear portion of the vehicle and has seventh and eighth end portions E7, E8.

The first link member 52 is formed to extend in one direction while bending mildly. One end portion of the first link member 52 is referred to as a first portion 52a, and the other end of the first link member 52 is referred to as a third portion 52c. Further, a substantially center portion of the first link member 52 is referred to as a second portion 52b.

The second link member 53 is a bar-shaped member extending linearly in one direction. One end portion of the second link member 53 is referred to as a fourth portion 53a, and the other end portion of the second link member 53 is referred to as a fifth portion 53b.

The seventh end portion E7 of the rear suspension 51 is connected to the link shaft 31S provided at the second coupling member 30. On the other hand, the first portion 52a of the first link member 52 is connected to the eighth end portion E8 of the rear suspension 51.

Here, a link member connecting portion 6P is provided at the front half portion of the rear arm 6 to project upwardly. The second portion 52b of the first link member 52 is connected to the link member connecting portion 6P of the rear arm 6.

The fourth portion 53a of the second link member 53 is connected to the third portion 52c of the first link member 52. The fifth portion 53b of the second link member 53 is connected to the link shaft 41S provided at the third coupling member 40.

In each of the connecting portion between the second coupling member 30 and the rear suspension 51, the connecting portion between the rear suspension 51 and the first link member 52 and the connecting portion between the first link member 52 and the rear arm 6, one member and the other member are rotatable relative to each other about an axis in parallel with the left-and-right direction LR. Further, in each of the connecting portion between the first and second link members 52, 53 and the connecting portion between the second link member 53 and the third coupling member 40, one member and the other member are rotatable relative to each other about an axis in parallel with the left-and-right direction LR.

With the above-mentioned configuration, part of the rear arm 6 is supported at the main frame 1M via the rear suspension 51 so as to be swingable in the up-and-down direction of the vehicle. Thus, when shock generated in the rear wheel 7 is transmitted to the rear suspension 51, the rear suspension 51 absorbs the transmitted shock.

[6] Effects (1) In the above-mentioned motorcycle 100, the engine 5 is supported by the body frame 1. When the vehicle is being driven by the user, various loads are applied to the body frame 1. For example, in the body frame 1, the force that makes the left and right main rails 1ML, 1MR to move away from each other or the force that brings the left and right main rails closer to each other is applied between the left and right main rails 1ML, 1MR in order to fix the engine 5 at the body frame 1 against an inertial force generated during traveling of the vehicle.

In a case where the body frame 1 has high rigidity with respect to the force applied between the left and right main rails 1ML, 1MR, the body frame 1 is unlikely to be deformed. On the other hand, in a case where the body frame 1 has low rigidity with respect to the force applied between the left and right main rails 1ML, 1MR, the body frame 1 is likely to be deformed. The degree of deformation affects riding comfort of the motorcycle 100.

Further, at least part of the shock transmitted from the rear wheel 7 to the rear arm 6 is absorbed by the rear suspension 51 of the shock-absorbing mechanism 50. The shock-absorbing mechanism 50 is connected to the second and third coupling members 30, 40. In this case, the shock that cannot be completely absorbed by the rear suspension 51 is transmitted to the second and third coupling members 30, 40. In a case where rigidity of the second and third coupling members 30, 40 is high with respect to the shock transmitted to each of the second and third coupling members 30, 40, the second and third coupling members 30, 40 are unlikely to be deformed. On the other hand, in a case where rigidity of the second and third coupling members 30, 40 is low with respect to the shock transmitted to the second and third coupling members 30, 40, the second and third coupling members 30, 40 are likely to be deformed. The degree of deformation of the second and third coupling members 30, 40 in this case affects riding comfort of the motorcycle 100.

With the above-mentioned configuration, the front portions 11L, 11R of the left and right main rails 1ML, 1MR are coupled to each other by the first coupling member 20. The middle portions 12L, 12R of the left and right main rails 1ML, 1MR are coupled to each other by the second coupling member 30. The rear portions 13L, 13R of the left and right main rails 1ML, 1MR are coupled to each other by the third coupling member 40. Further, these members are connected to the body frame 1 with the plurality of bolts B1 to B3. Therefore, it is possible to easily obtain desired rigidity in regard to each component of the body frame 1 by suitably adjusting the shape and material of the first to third coupling members 20, 30, 40 and attaching the first to third coupling members 20, 30, 40 to the body frame 1. Thus, desired riding comfort in the motorcycle 100 is realized. As the material for the first, second and third coupling members 20, 30, 40, metal, a reinforced resin or the like can be used.

Further, in this case, a plurality of types of the first to third coupling members 20, 30, 40 that provide required riding comfort are prepared, whereby a plurality of types of motorcycles 100 using the common body frame 1 can be manufactured.

As a result, a plurality of types of motorcycles 100 can be manufactured at low cost, and the rider can obtain appropriate riding comfort provided by the type of a motorcycle 100.

(2) As described above, the portion in the vicinity of the upper end of the left side surface of the engine 5 is supported at the main frame 1M by the engine bracket 60L. Further, the portion in the vicinity of the upper end of the right side surface of the engine 5 is supported at the main frame 1M by the engine bracket 60R. In a case where having high rigidity, each engine bracket 60L, 60R is unlikely to be deformed. On the other hand, in a case where having low rigidity, each engine bracket 60L, 60R is likely to be deformed. This degree of deformation affects riding comfort of the motorcycle 100.

With the above-mentioned configuration, the left and right engine brackets 60L, 60R are connected to the body frame 1 and the engine 5 with the plurality of bolts B4. Thus, desired riding comfort in the motorcycle 100 is realized by adjustment of the shape and material of the left and right engine brackets 60L, 60R. As the material for the engine brackets 60L, 60R, metal, a reinforced resin or the like can be used.

[7] Painting Method of Body Frame 1

Figure 7:
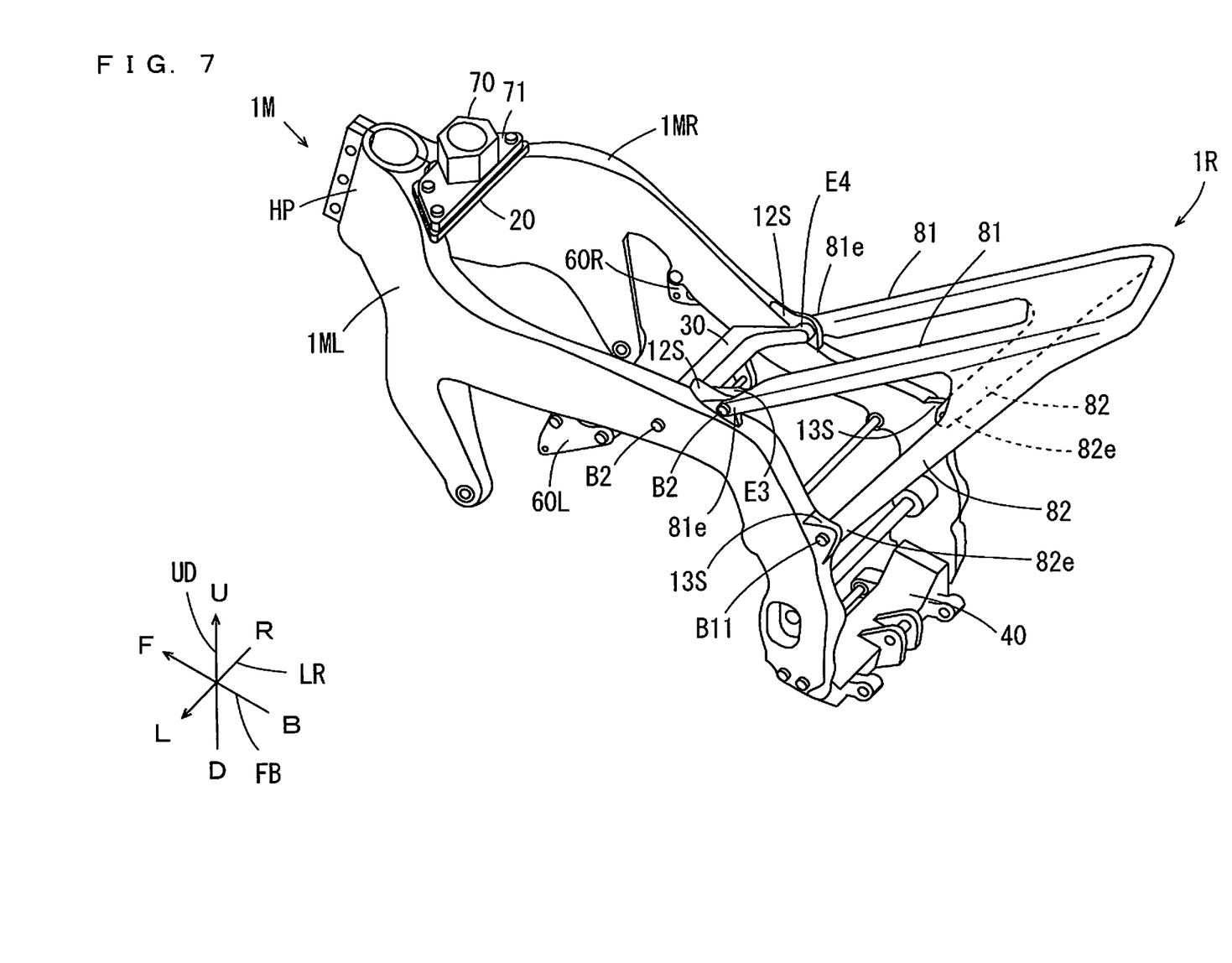
FIG. 7 is an external perspective view showing one example of a rear frame being attached to the main frame of FIG. 2 together with the plurality of frame attachment members.

FIG. 7 is an external perspective view showing one example of the rear frame 1R being attached to the main frame 1M of FIG. 2 together with the plurality of frame attachment members. As shown in FIG. 7, the rear frame 1R is constituted by a pair of left and right upper rails 81 and a pair of left and right lower rails 82. The left and right upper rails 81 are formed to be arranged in the left-and-right direction LR and extend in the front-and-rear direction FB, and their rear end portions are connected to each other. On the other hand, the left and right lower rails 82 are formed to extend downwardly and forwardly from positions in the vicinity of the rear ends of the left and right upper rails 81. With such a configuration, the rear frame 1R has substantially a U-shape in a plan view of the vehicle.

A front end portion 81e of the left upper rail 81 is arranged leftwardly of the left frame connecting portion 12S to come into contact with the left frame connecting portion 12S. In this state, the front end portion 81e of the left upper rail 81, the left frame connecting portion 12S and the third end portion E3 of the second coupling member 30 are connected to one another with one bolt B2. A front end portion 81e of the right upper rail 81 is arranged rightwardly of the right frame connecting portion 12S to come into contact with the right frame connecting portion 12S. In this state, the front end portion 81e of the right upper rail 81, the right frame connecting portion 12S and the fourth end portion E4 of the second coupling member 30 are connected to one another with one bolt B2 (FIG. 4).

Further, the front end portion 82e of the left lower rail 82 is arranged rightwardly of the left frame connecting portion 13S to come into contact with the left frame connecting portion 13S. In this state, the front end portion 82e of the left lower rail 82 and the left frame connecting portion 13S are connected to each other with one bolt B11. The front end portion 82e of the right lower rail 82 is arranged leftwardly of the right frame connecting portion 13S to come into contact with the right frame connecting portion 13S. In this state, the front end portion 82e of the right lower rail 82 and the right frame connecting portion 13S are connected to each other with one bolt.

When the body frame 1 according to the present embodiment is manufactured, the rear frame 1R is attached to the main frame 1M as described above, and then the surfaces of the main and rear frames 1M, 1R are painted. In this case, it is not necessary to paint the main and rear frames 1M, 1R separately. Therefore, it is not necessary to perform masking on the connecting portions between the main and rear frames 1M, 1R. Therefore, a manufacturing cost of the motorcycle 100 can be reduced.

[8] Other Embodiments (1) While the main frame 1M is formed by connection of the pair of left and right main rails 1ML, 1MR of the main frame 1M to each other with the plurality of bolts and nuts in the motorcycle 100 according to the above-mentioned embodiment, the present invention is not limited to this.

The main frame 1M may be formed by connection of the main rails 1ML, 1MR to each other by welding. Alternatively, the main frame 1M may be formed by connection of a pair of left and right rail members to a single member including the head pipe HP, for example, by welding.

(2) While part of the engine 5 is supported at the main frame 1M by the engine brackets 60L, 60R in the motorcycle 100 according to the above-mentioned embodiment, the present invention is not limited to this. Part of the engine 5 may be directly supported at the main frame 1M. That is, a portion in the vicinity of the upper end of the engine 5 may be directly connected to the main frame 1M with the bolt B4 or does not have to be connected to the main frame 1M. In this case, the number of components of the motorcycle 100 is reduced.

(3) While the surfaces of the main and rear frames 1M, 1R are painted after attachment of the rear frame 1R to the main frame 1M in the manufacturing method of the body frame 1 according to the above-mentioned embodiment, the present invention is not limited to this. The main and rear frames 1M, 1R may be painted separately.

(4) While the above-mentioned embodiment is an example in which the present invention is applied to the motorcycle, the present invention is not limited to this. The present invention may be applied to another straddled vehicle such as a four-wheeled automobile, a motor tricycle or an ATV (All Terrain Vehicle).

[9] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained.

In the above-mentioned embodiment, the head pipe HP is an example of a head pipe, the main rails 1ML, 1MR are an example of a pair of left and right main rails, the body frame 1 is an example of a body frame, the front portions 11L, 11R are an example of front portions of the left and right main rails and the first coupling member 20 is an example of a first coupling member.

Further, the middle portions 12L, 12R are an example of middle portions of the left and right main rails, the second coupling member 30 is an example of a second coupling member, the lower ends of the rear portions 13L, 13R are an example of rear end portions of the left and right main rails and the third coupling member 40 is an example of a third coupling member.

Further, the rear wheel 7 is an example of a drive wheel, the bolt B1 is an example of a first bolt, the bolt B2 is an example of a second bolt, the bolt B3 is an example of a third bolt, the engine bracket 60L is an example of a left engine bracket, the engine bracket 60R is an example of a right engine bracket and the bolt B4 is an example of fourth and fifth bolts.

As each of constituent elements recited in the claims, various other elements having configurations or functions described in the claims can be also used.

What is claimed is:

1. A straddled vehicle, comprising:
   a body frame having a head pipe, and a pair of main rails that includes a left main rail and a right main rail both extending from the head pipe rearwardly, and downwardly while spreading in a left-and-right direction, in a plan view of the vehicle, the left and right main rails each including a front portion at the head pipe, a rear end portion rearward of the front portion, and a middle portion positioned between the front portion and the rear end portion;
   a first coupling member that couples the front portions of the left and right main rails to each other, the first coupling member consisting of a single element;
   a second coupling member that couples the middle portions of the left and right main rails to each other;
   a third coupling member that couples the rear end portions of the left and right main rails to each other;
   an engine supported by the body frame;
   a drive wheel rotated by the engine;
   a rear arm extending rearwardly of the vehicle from a position downward of the second coupling member and upward of the third coupling member of the body frame in a side view of the vehicle and rotatably supporting the drive wheel; and
   a rear suspension connected to the second coupling member so as to at least partially absorb shock transmitted from the drive wheel to the rear arm; and
   a rear frame member consisting of a single element shaping a pair of left and right upper rails, wherein
   the left and right upper rails respectively have left and right frame connecting portions respectively contacting outer side surfaces of the middle portions of the left and right main rails,
   the first coupling member has a first end portion and a second end portion respectively extending to be overlapped with the front portions of the left and right main rails so that a plurality of first bolts fasten, in the up-and-down direction of the vehicle, overlapped portions of the first and second end portions and the front portion,
   the second coupling member has a third end portion and a fourth end portion respectively contacting inner side surfaces of the middle portions of the left and right main rails so that one of a plurality of second bolts fastens, in the left-and-right direction, the third end portion, the middle portion of the right main rail, and the right rear frame connecting portion of the rear frame member all together, and another one of the plurality of second bolts fastens, in the left-and-right direction, the fourth end portion, the middle portion of the left main rail, and the left rear frame connecting portion of the rear frame member all together, and
   the third coupling member has a fifth end portion and a sixth end portion respectively contacting side surfaces of the rear end portions of the left and right main rails so that a plurality of third bolts fasten, in the left-and-right direction, the side surfaces of the rear end portions.

2. The straddled vehicle according to claim 1, wherein the front portion of the left main rail has a first attachment portion that supports the first end portion of the first coupling member,
   the front portion of the right main rail has a second attachment portion that supports the second end portion of the first coupling member,
   one or a plurality of first screw holes are formed in the first attachment portion to be directed upwardly, each first bolt of a part of the plurality of first bolts being attached to one of the first screw holes,
   one or a plurality of second screw holes are formed in the second attachment portion to be directed upwardly, each first bolt of a rest of the plurality of first bolts being attached to one of the second screw holes,
   one or a plurality of first through holes respectively corresponding to one of the one or plurality of first screw holes are formed in the first end portion of the first coupling member,
   one or a plurality of second through holes respectively corresponding to one of the one or plurality of second screw holes are formed in the second end portion of the first coupling member, and
   said each first bolt of the part of the plurality of first bolts is attached to one of the first screw holes through a corresponding one of the first through holes, and said each first bolt of the rest of the plurality of first bolts is attached to one of the second screw holes through a corresponding one of the second through holes, while the first and second end portions of the first coupling member are respectively supported by the first and second attachment portions of the body frame.

3. The straddled vehicle according to claim 1, wherein
one or a plurality of third screw holes are formed at the third end portion of the second coupling member to be directed leftwardly, each second bolt of a part of the plurality of second bolts being attached to one of the third screw holes,
one or a plurality of fourth screw holes are formed in the fourth end portion of the second coupling member to be directed rightwardly, each second bolt of a rest of the plurality of second bolts being attached to one of the fourth screw holes,
one or a plurality of third through holes respectively corresponding to one of the one or plurality of third screw holes are formed in the middle portion of the left main rail,
one or a plurality of fourth through holes respectively corresponding to one of the one or plurality of fourth screw holes are formed in the middle portion of the right main rail, and
said each second bolt of the part of the plurality of second bolts is attached to one of the third screw holes through a corresponding one of the third through holes from a position leftward of the body frame, and said each second bolt of the rest of the plurality of second bolts is attached to one of the fourth screw holes through a corresponding one of the fourth through holes from a position rightward of the body frame, while the second coupling member is arranged between the left and right middle portions of the body frame such that the third screw holes of the third end portion of the second coupling member are directed leftwardly and the fourth screw holes of the fourth end portion of the second coupling member are directed rightwardly.

4. The straddled vehicle according to claim 1, wherein
one or a plurality of fifth screw holes are formed in the fifth end portion of the third coupling member to be directed leftwardly, each third bolt of a part of the plurality of third bolts being attached to one of the fifth screw holes,
one or a plurality of sixth screw holes are formed in the sixth end portion of the third coupling member to be directed rightwardly, each third bolt of a rest of the plurality of third bolts being attached to one of the sixth screw holes,
one or a plurality of fifth through holes respectively corresponding to one of the one or plurality of fifth screw holes are formed in the rear end portion of the left main rail,
one or a plurality of sixth through holes respectively corresponding to one of the one or plurality of sixth screw holes are formed in the rear end portion of the right main rail, and
said each third bolt of the part of the plurality of third bolts is attached to one of the fifth screw holes from a position leftward of the body frame through a corresponding one of the fifth through holes, and said each third bolt of the rest of the plurality of third bolts is attached to one of the sixth screw holes from a position rightward of the body frame through a corresponding one of the sixth through holes, while the third coupling member is arranged between the left and right rear end portions of the body frame such that the fifth through holes of the fifth end portion of the third coupling member are directed leftwardly and the sixth through holes of the sixth end portion of the third coupling member are directed rightwardly.

5. The straddled vehicle according to claim 1, further comprising:
a first link member having a first portion, a second portion and a third portion; and
a second link member having a fourth portion and a fifth portion, wherein
the rear suspension has a seventh end portion and an eighth end portion,
the seventh end portion of the rear suspension is connected to the second coupling member,
the first portion of the first link member is connected to the eighth end portion of the rear suspension,
the second portion of the first link member is connected to the rear arm,
the fourth portion of the second link member is connected to the third portion of the first link member, and
the fifth portion of the second link member is connected to the third coupling member.

6. The straddled vehicle according claim 1, further comprising:
a left engine bracket that is attached to the left main rail and is connected to a left portion of the engine with a plurality of fourth bolts, to support the engine at the left main rail; and
a right engine bracket that is attached to the right main rail and is connected to a right portion of the engine with a plurality of fifth bolts, to support the engine at the right main rail.

7. The straddled vehicle according to claim 1, where the single element is a plate.

* * * * *